US006360256B1

(12) United States Patent
Lim

(10) Patent No.: US 6,360,256 B1
(45) Date of Patent: *Mar. 19, 2002

(54) NAME SERVICE FOR A REDUNDANT ARRAY OF INTERNET SERVERS

(75) Inventor: Swee B. Lim, Mountain View, CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/673,951

(22) Filed: Jul. 1, 1996

(51) Int. Cl.[7] .................................................. G06F 13/14
(52) U.S. Cl. ........................ 709/223; 709/105; 709/203; 709/207; 709/218; 709/227; 709/249
(58) Field of Search ...................... 364/200; 395/200.11, 395/200.59, 200.53, 200.31; 709/200, 203, 229, 217, 219–223, 227, 238, 242, 224, 200.11, 200.59, 200.53, 200.31, 105, 100, 102, 103, 104, 107, 108, 207, 218

(56) References Cited

U.S. PATENT DOCUMENTS

| 4,642,758 | A | * | 2/1987 | Teng ........................... 364/200 |
|---|---|---|---|---|
| 5,410,651 | A | * | 4/1995 | Sekizawa et al. ............ 709/224 |
| 5,539,883 | A | * | 7/1996 | Allon et al. ............ 395/200.11 |
| 5,740,371 | A | * | 4/1998 | Wallis .................... 395/200.59 |
| 5,774,660 | A | * | 6/1998 | Brendel et al. ......... 395/200.31 |
| 5,774,668 | A | * | 6/1998 | Choquier et al. ....... 395/200.53 |

OTHER PUBLICATIONS

Dias et al. "A Scalable and Highly Available Web Server" pp 85 –92, IEEE, Feb. 1996.*
Zhu et al. "An Experimental Study of Load Balancing on Amoeba" pp 220 –226, IEEE, Mar. 1995.*

* cited by examiner

Primary Examiner—Jessica J. Harrison
Assistant Examiner—Yveste G. Cherubin
(74) Attorney, Agent, or Firm—O'Melveny & Myers LLP

(57) ABSTRACT

A self-reconfiguring name service that distributes workload among the available servers in a system. A Service Monitor for each host system of a site periodically broadcasts information about available servers. The broadcast message also indicates the workload of the host. Each name service (DNS) has an associated process called a Name Binder Modifier that receives the broadcast messages from the Service Monitors. Periodically, each Name Binder Modifier reviews the information it has received from various Service Monitors and updates zones that are used by the DNS to perform load balancing. The Service Monitor and the Name Binding Modifier have associated configuration files.

8 Claims, 7 Drawing Sheets

SEND BROADCAST MESSAGE
(SERVICE MONITOR)

RECEIVE BROADCAST MESSAGE (NAME BINDER MODIFIER)

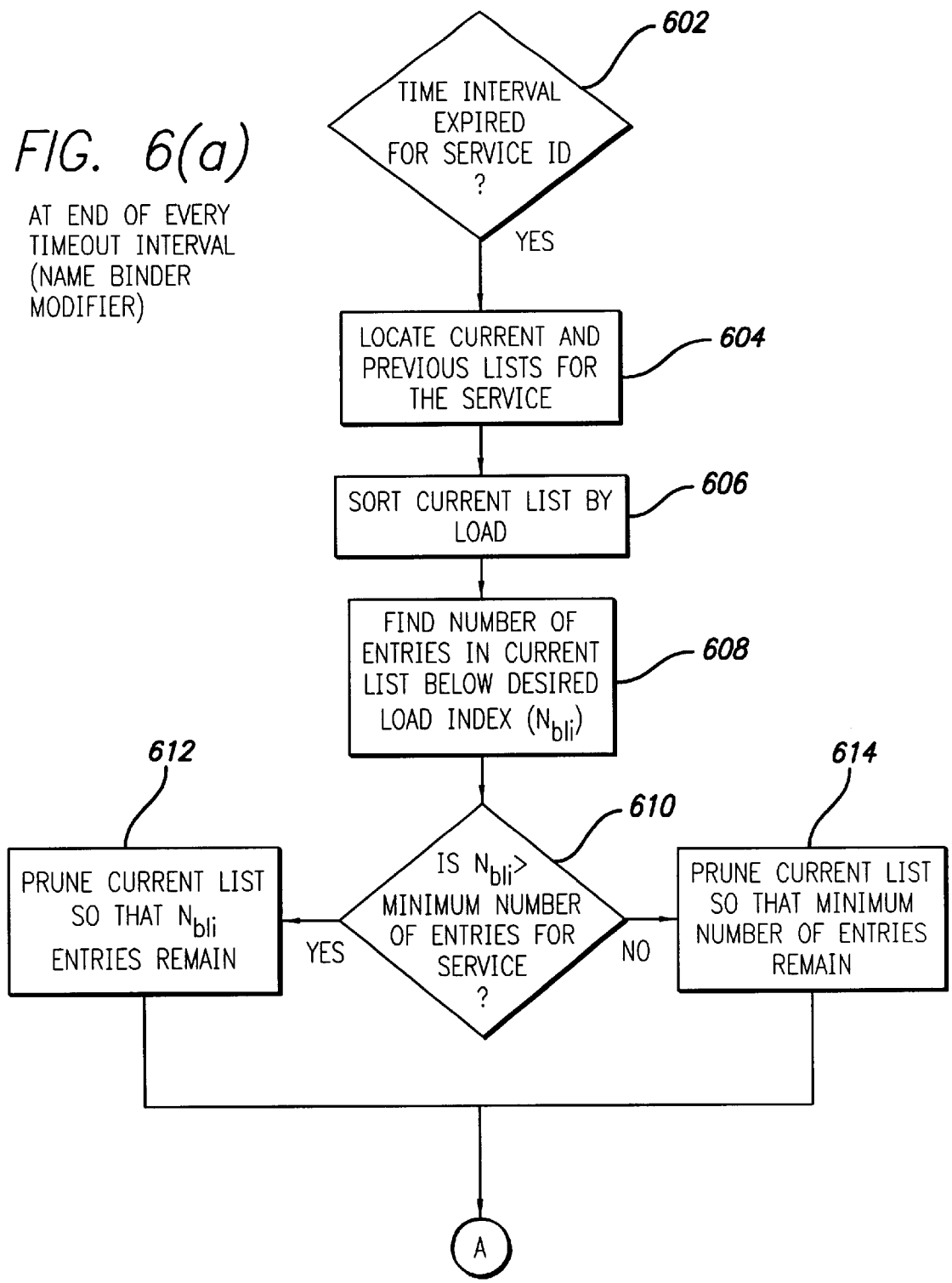

FIG. 7
CONFIG. FILE FOR SERVICE MONITOR

```
702 { SERVICE 60 HTTP 80
      SERVICE 120 NEWS 119
704 —— SAMPLE-LOAD 120
706 { EXCLUDE-ADDRESSES 129.144.86.10, 129.144.86.20
      EXCLUDE-SUBNET 129.144.177.0 255.255.255.0
      . . .
```
182

FIG. 8
CONFIG FILE FOR NAME BINDING MODIFIER

```
DNS-UPDATE 120 HTTP www.isg.sun.com.header www.isg.sun.com.cache 1 60
DNS-UPDATE 240 NEWS news.isg.sun.com.header news.isg.sun.com.cache 2 60
```

FIG. 9
CONFIG FILE FOR DNS SERVER ZONE FILES

| DOMAIN NAME OF ZONE | FILE CONTAINING ZONE INFO | BALANCING SCHEME |
|---|---|---|
| a.sun.com | /etc/a.data | RR |
|  |  | OTHER |
|  |  | RR |

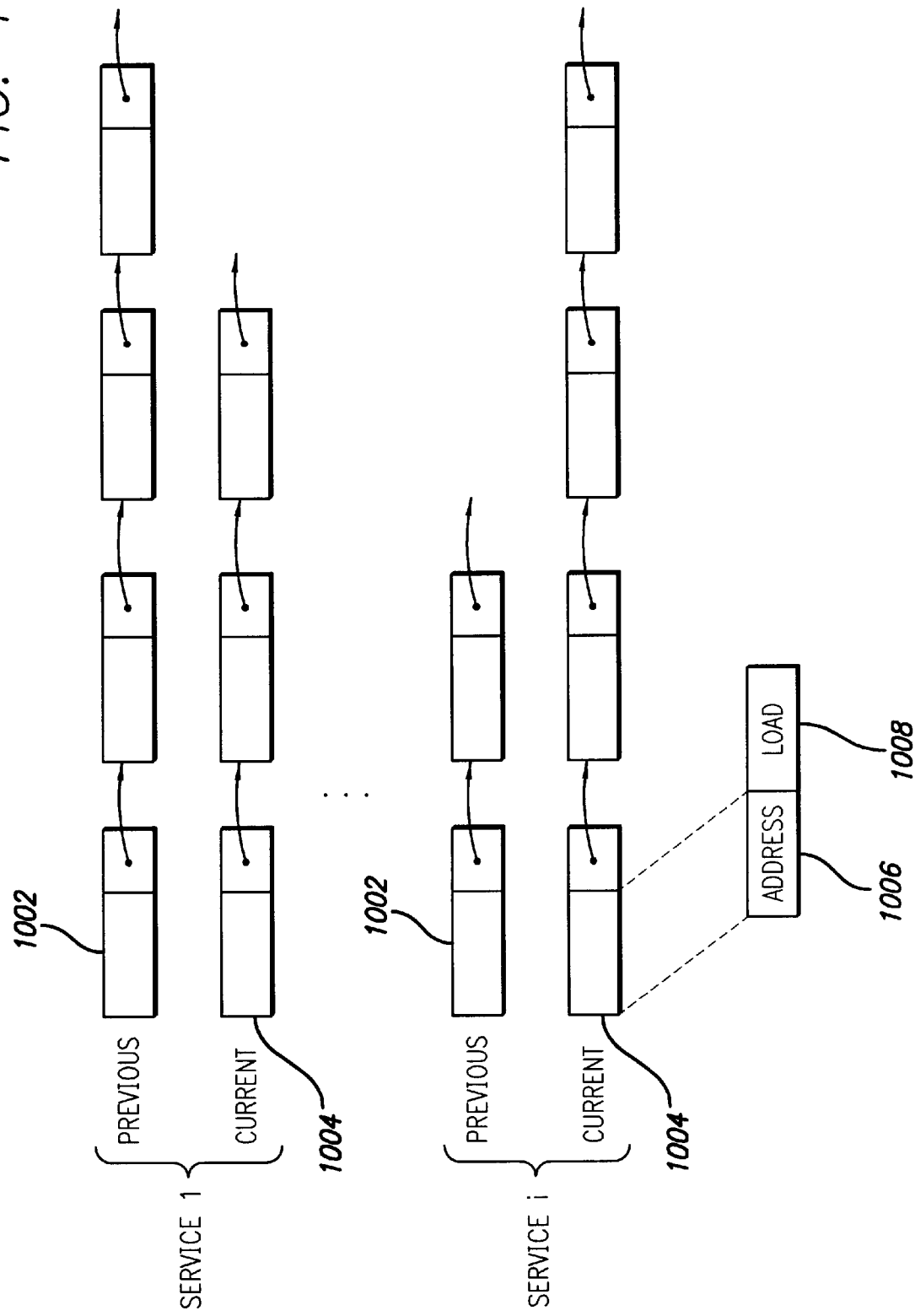

NAME SERVICE FOR A REDUNDANT ARRAY OF INTERNET SERVERS

FIELD OF THE INVENTION

This application relates to distributed computing using the client/server model and, more specifically, to an improved name service for a client/server system.

BACKGROUND OF THE INVENTION

In recent years, the internet has become extremely popular. Using the internet, a group of users in widely scattered locations can retrieve information located at a centralized site. The site, which may offer one or more "services" (also called "resources"), is connected to the internet through a high speed connection. A user can access the site via the internet to read electronic mail, read news via Usenet, or view World Wide Web pages. As the speed of the connections between the user and the site improves, more users will be attempting to access the site's resources at a given time.

Internet services in a site are accessed via the servers of the site. Multiple servers can provide access to a single service. Similarly, a single server can provide access to multiple services.

Resources on the internet are accessed via names. A resource name typically contains multiple name components. The first name component is a domain name. This domain name typically refers to one or more hosts and conventionally is resolved through the Domain Name Service (DNS) of the site. An implicit or explicit second name component identifies the communications endpoint or server that will be used to access the resource on a particular host. The remaining name components are processed by the identified server to access the specified resource on the located host.

For example, a WWW hypertext document is named by a Uniform Resource Locator (URL), such as:

http://www.sun.com/welcome.html.

To access this document, the domain name component, www.sun.com, is first resolved to locate a host. Then, the hypertext transfer protocol (http) name component identifies a communications endpoint on the located host. An http server communicates with the client through this endpoint and retrieves the document specified by the remaining component of the name, /welcome.html. The File Transfer Protocol (FTP) service uses similar URLs.

Usenet news articles are named in a similar way. To obtain a news article, the news reader client resolves a domain name to locate a news server. It then communicates with the news server using a well-known endpoint to retrieve a particular article on the news server.

Many internet systems include a process called a "name service" that examines the type of service required by each incoming request and returns a list of addresses of servers that can handle the request. It is the responsibility of the name service to balance the workload of the system by returning the addresses in such a way that work is spread evenly between the servers.

In a redundant server system, a site has more then one server. These servers collectively serve the entire user population. A problem arises when certain servers are performing more than their share of the workload of incoming user tasks. Some servers are operating at or near their capacity while other servers that could be sharing the workload remain idle. Such a system is said to have an "unbalanced" workload. It is desirable to balance the workload of the servers as much as possible.

In addition, servers go in and out of service. Because any server can serve any user, the workload of a failed server can be assigned to other working servers. A conventional redundant server system effects load balancing using a "round robin" scheme to assign incoming requests to servers. As each request is received, the DNS service assigns a next server of the available servers. A round robin scheme for load balancing is not always satisfactory because the name service does not always have up-to-date information about which servers are actually available. For example, a server may have failed or may have been added to the system without the name service being notified. Conventional name services often rely on a human being to reconfigure the knowledge that the name service has about the system.

A site installs one or more internet servers to gain access to the internet and its services. The primary goal is to enable a site to deploy its internet servers in a highly "scalable" and "reliable" manner. A "scalable deployment" architecture allows the site to support a large number of users and to increase capacity gracefully as the number of users increases. A "reliable" architecture minimizes the impact of component failures. It may mask failures by redistributing the workload of failed components to working components.

SUMMARY OF THE INVENTION

The present invention overcomes the problems and disadvantages of the prior art by implementing a self-reconfiguring name service that distributes workload among the available servers in a system. A Service Monitor for each host system of a site periodically broadcasts information about available servers. As new servers are added to the host, they are announced by way of this broadcast message. The broadcast message also indicates the workload of the host.

Each name service has an associated process called a Name Binder Modifier that receives the broadcast messages from the Service Monitors. Periodically, each Name Binder Modifier reviews the information it has received from various Service Monitors. The Name Binder Modifier maintains a list for each service of available servers. For each service, servers executing on a host whose workload exceeds a predetermined workload value are deleted from a list of available servers. The list of available servers for each service contains at least a minimum number of servers whenever possible, however.

The Name Binder Modifier periodically updates a plurality of zone files for respective services in accordance with its lists to indicate which servers are available to have work routed to them. The Name Binder Modifier assumes that servers which have not broadcast a message within an update interval are no longer available. The DNS service loads information from the updated zone files for use in its routing scheme.

Each Service Monitor has an associated configuration file specifying, for each service, a time interval after which the Service Monitor should send a broadcast message. Furthermore, each Name Binder Modifier has a configuration file specifying, for each service, a time interval after which the zone files should be updated in accordance with the broadcast messages, a minimum number of servers for the service, and a maximum desirable workload per server.

In accordance with the purpose of the invention, as embodied and broadly described herein, the invention is a method for reconfiguring a load balancing system, comprising the steps, performed by a data processing system, of sending, by a Service Monitor, for a service of the data processing system, a broadcast message containing a workload of a host on which the service is located and a list of addresses of the host; receiving, by a Name Binding Modifier, the broadcast message; and updating, by the Name Binding Modifier, a zone file in accordance with the information in the broadcast message.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

DETAILED DESCRIPTION OF THE PREFERRED EMBODIMENTS

The accompanying drawings, which are incorporated in and constitute a part of this specification, illustrate several embodiments of the invention and, together with the description, serve to explain the principles of the invention.

FIG. 1 is a block diagram of a computer system in accordance with a preferred embodiment of the present invention.

FIG. 2 shows an example of a host system having a plurality of servers and services.

FIG. 3 is a flow chart of steps performed by a Service Monitor of FIG. 1 to send a broadcast message.

FIG. 4 shows an example of a format of a broadcast message.

FIG. 5 is a flow chart of steps performed by a Name Binding Modifier of FIG. 1 when it receives a broadcast message.

FIGS. 6(a) and 6(b) are flow charts of steps performed by the Name Binding Modifier when a timer for a service expires.

FIG. 7 shows an example of a configuration file for a Service Monitor.

FIG. 8 shows an example of a configuration file for a Name Binder Modifier.

FIG. 9 shows an example of a configuration file for a DNS service.

FIG. 10 shows an example of several previous and next lists in the Name Binding Modifier.

BRIEF DESCRIPTION OF THE DRAWINGS

Reference will now be made in detail to the preferred embodiments of the invention, examples of which are illustrated in the accompanying drawings. Wherever possible, the same reference numbers will be used throughout the drawings to refer to the same or like parts.

Figure 1:
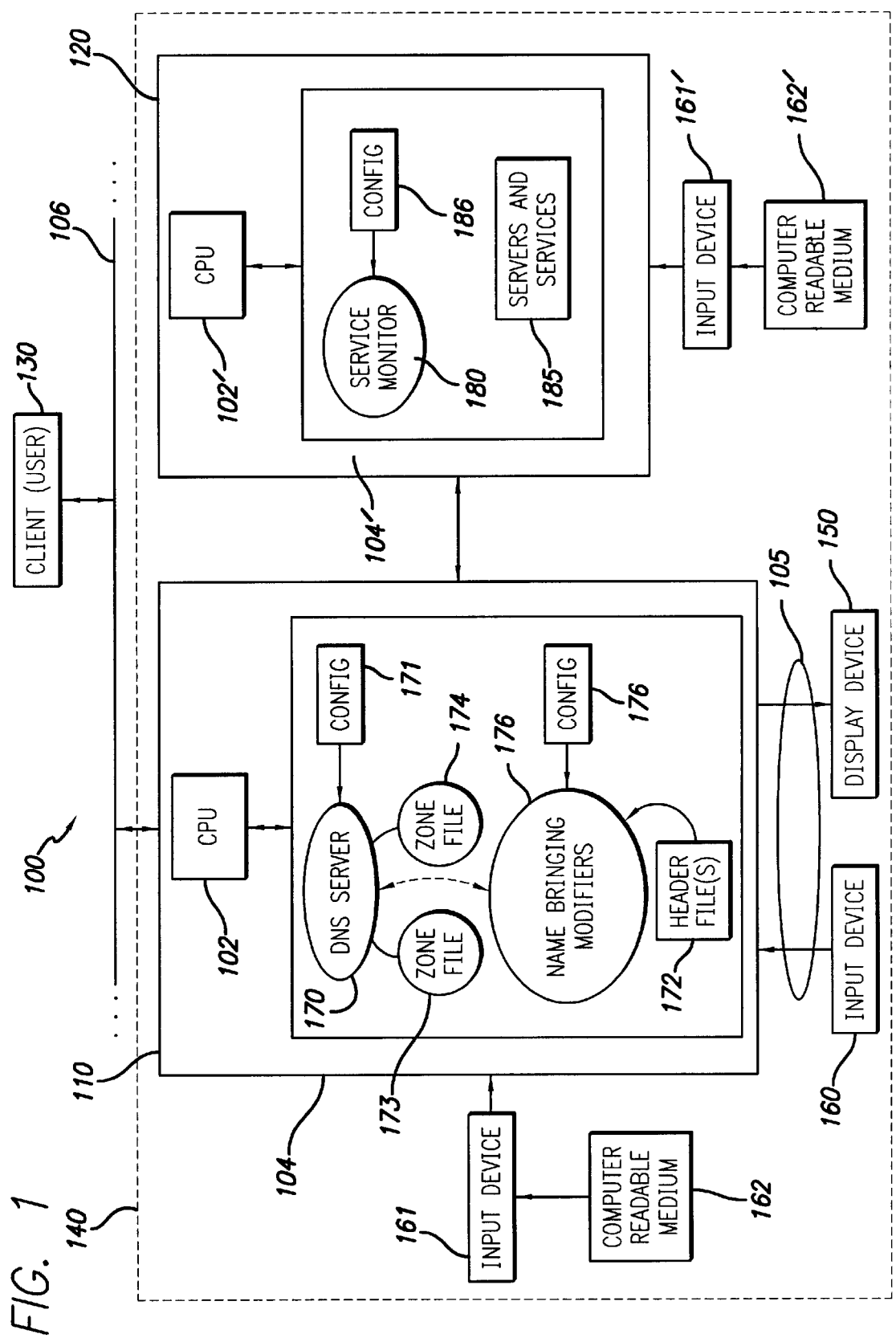
FIG. 1 is a block diagram of a computer system in accordance with a preferred embodiment of the present invention. A client 130 communicates with server 140 over line 106, which can be, for example, a LAN, a WAN, or an internet connection. Line 106 can also represent a wireless connection, such as a cellular network connection. Server 140 includes a first computer 110 and a second computer 120. First computer 110 and second computer 120 are connected together via line 107.

First computer 110 includes a CPU 102; a memory 104; input/output lines 105; an input device 160, such as a keyboard or mouse; and a display device 150, such as a display terminal. First computer 110 further includes an input device 161 for reading a computer usable medium 162 having computer readable program code means embodied therein. Input device 161 is, for example, a disk drive.

Memory 104 of first computer 110 includes two server processes (also called "daemons"): Domain Name Server (DNS) server 170 and Name Binding Modifier 176. Name Binder Modifier 176 runs on every system that has a DNS server. Name Binder Modifier server 176 has an associated configuration file 178 and one or more associated header files 172 (one per zone file). DNS server 170 has a plurality of zone files 173, 174. Each zone file corresponds to a service available on the system.

A preferred embodiment of the present invention includes a second DNS server (not shown) to provide redundancy. A person of ordinary skill in the art will understand that memory 104 also contains additional information, such as application programs, operating systems, data, etc., which are not shown in the figure for the sake of clarity.

Second computer 120 includes a CPU 102' and a memory 104'. Second computer 120 further includes an input device 161' for reading a computer usable medium 162' having computer readable program code means embodied therein. Input device 161' is, for example, a disk drive. Memory 104' of second computer 120 includes a Service Monitor process (also called a "daemon") 180 and a plurality of servers and services 185 (not shown). Service Monitor 180 has an associated configuration file 186. Generally, each host system has its own Service Monitor 180.

A person of ordinary skill in the art will understand that memory 104' also contains additional information, such as application programs, operating systems, data, etc., which are not shown in the figure for the sake of clarity. It will be understood by a person of ordinary skill in the art that computer system 100 can also include numerous elements not shown in the Figure for the sake of clarity, such as additional disk drives, keyboards, display devices, network connections, additional memory, additional CPUs, LANs, input/output lines, etc. A preferred embodiment of the invention runs under the Solaris operating system, Version 2.5. Solaris is a registered trademark of Sun Microsystems, Inc.

In a preferred embodiment, the services in the system are divided into "zones." Specifically, the DNS name space is divided into zones. Each zone provides authoritative bindings between domain names in the zone and host addresses. Each binding preferably is stored in respective ones of zone files 173, 174. When a client resolves a domain name, DNS server 170 sends to the client all host addresses associated with the domain name. Typically, the client uses the first host address.

DNS server 170 loads the data for each zone from a separate zone file 173, 174. Preferably, information for each service is stored in an independent zone. The bindings in a zone may change to add host addresses of new servers that provide the service or to remove host addresses of failed or overloaded servers. Having a zone per service allows binding changes to each individual service to be independent of changes to other services or zones.

Service Monitor 180 determines the availability of services and load on its host system. It also advertises the server's services the load level of its host through broadcast messages. Name Binding Modifier 176 listens to the broadcast messages and uses the information in the broadcast message to modify the zone files.

Figure 2:
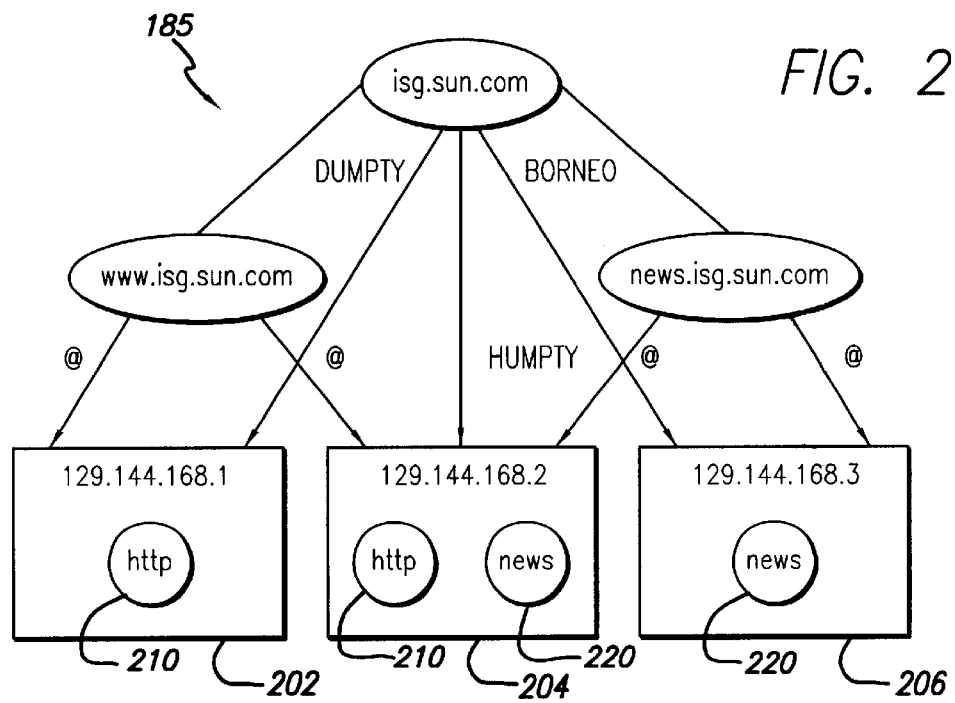

FIG. 2 shows an example of a plurality 185 of servers and services. In FIG. 2, three servers 202, 204, and 206 provide access to two services: http 210 and news 220. Server 202 has an address of 129.144.168.1. Server 204 has an address of 129.144.168.2. Server 206 has an address of 129.144.168.3.

Figure 3:
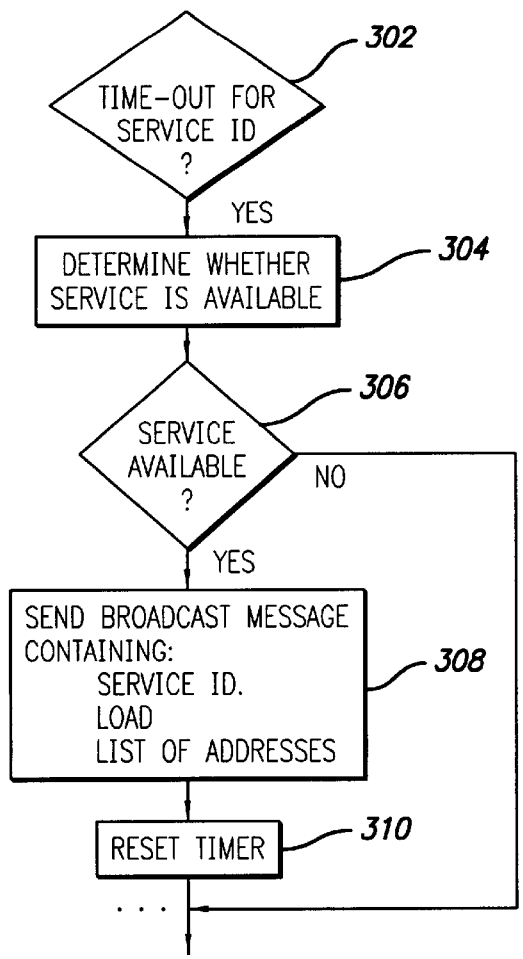

FIG. 3 is a flow chart of steps performed by Service Monitor 180 to send a broadcast message. Broadcast messages are known to persons of ordinary skill in the art and preferably are received by all components of the system, including Name Binder Modifier 176. The system includes a Service Monitor for each host in the system. Initially, Service Monitor 180 initializes a system timer for each service (not shown). Each timer times out after a respective, predetermined period of time. In the system of FIG. 2, there are two services and, thus, two timers. When the timer for a particular service times out in step 302, Service Monitor 180 determines in step 304 whether the service associated with the timer is still available from the host or whether the service is not available.

To determine availability, Service Monitor 180 probes the availability of the service on the local host by attempting to connect to a TCP port of the service, determined in accordance with the configuration file of FIG. 7. If the connect fails, then the service is not available. If the connect is successful, then the service is available on the host.

Figure 4:
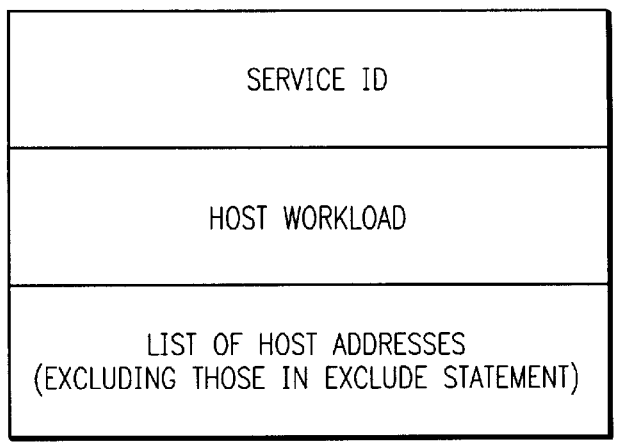

If the service is still available, in step 308, Service Monitor 180 sends a broadcast message, as shown in FIG. 4. A broadcast message contains a service ID for the service, a current load of the host, and a list of all the host's addresses (excluding those addresses in the exclusion list, as described below). Thus, a broadcast message for a service indicates that the service is available and which addresses can be used to access the service. Step 310 resets the timer for the service. The steps of FIG. 3 are repeated every time a timer for a service times out.

Figure 5:
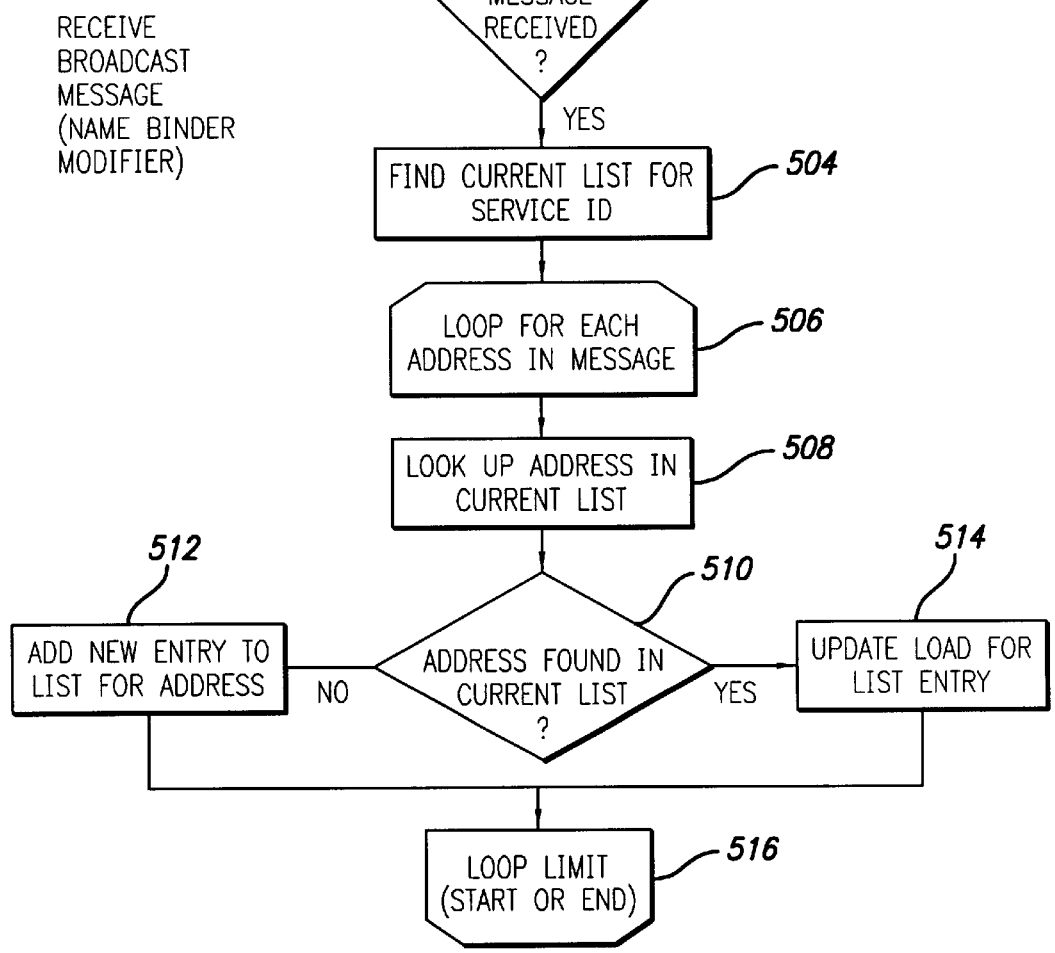

FIG. 5 is a flow chart of steps performed by Name Binding Modifier 176 of FIG. 1 when it receives a broadcast message. In step 502, the message sent in step 308 is received. The broadcast message includes a service ID, a current load, and a list of addresses. Steps 504–516 are performed for a "current list" of the service ID, as described below. If a current list is not found, one is created (along with an empty previous list).

FIG. 10 shows an example of several previous and next lists stored in memory 104 and used by Name Binding Modifier 176. (The term "list" is used herein for convenience of explanation and it will be understood that any appropriate data structure could be used to hold the information shown in FIG. 10.) Name Binding Modifier 176 includes a pair of lists for each service 1. i in the system. Each pair of lists includes a previous list 1002 and a current list 1004. Previous list 1002 reflects the services that were available at the end of a previous update period. Next list 1004 reflects the services that will be available after the current update period. Each element in lists 1002, 1004 contain an address 1006 and a load value 1008. Each address 1006 reflects an address of the host. Each load value 1008 reflects a workload of the host.

In FIG. 5, steps 506 through 516 form a loop that is performed by Name Binding Modifier 176 for each address in the list of addresses in the broadcast message received in step 502. In step 508, Name Binding Modifier 176 searches current list 1004 of the service ID. If the address is not found in the current list in step 510, then a new entry is added to the current list in step 512. The new entry contains the current address and the current workload (from the broadcast message). If the address in the message is found in the current list in step 510, then the workload value from the broadcast message is used to update the found entry in step 514. Thus, the current list for the service ID contains the current workloads and addresses of hosts providing available services. Note that broadcast messages can be received from multiple Service Monitors.

Figure 6B:
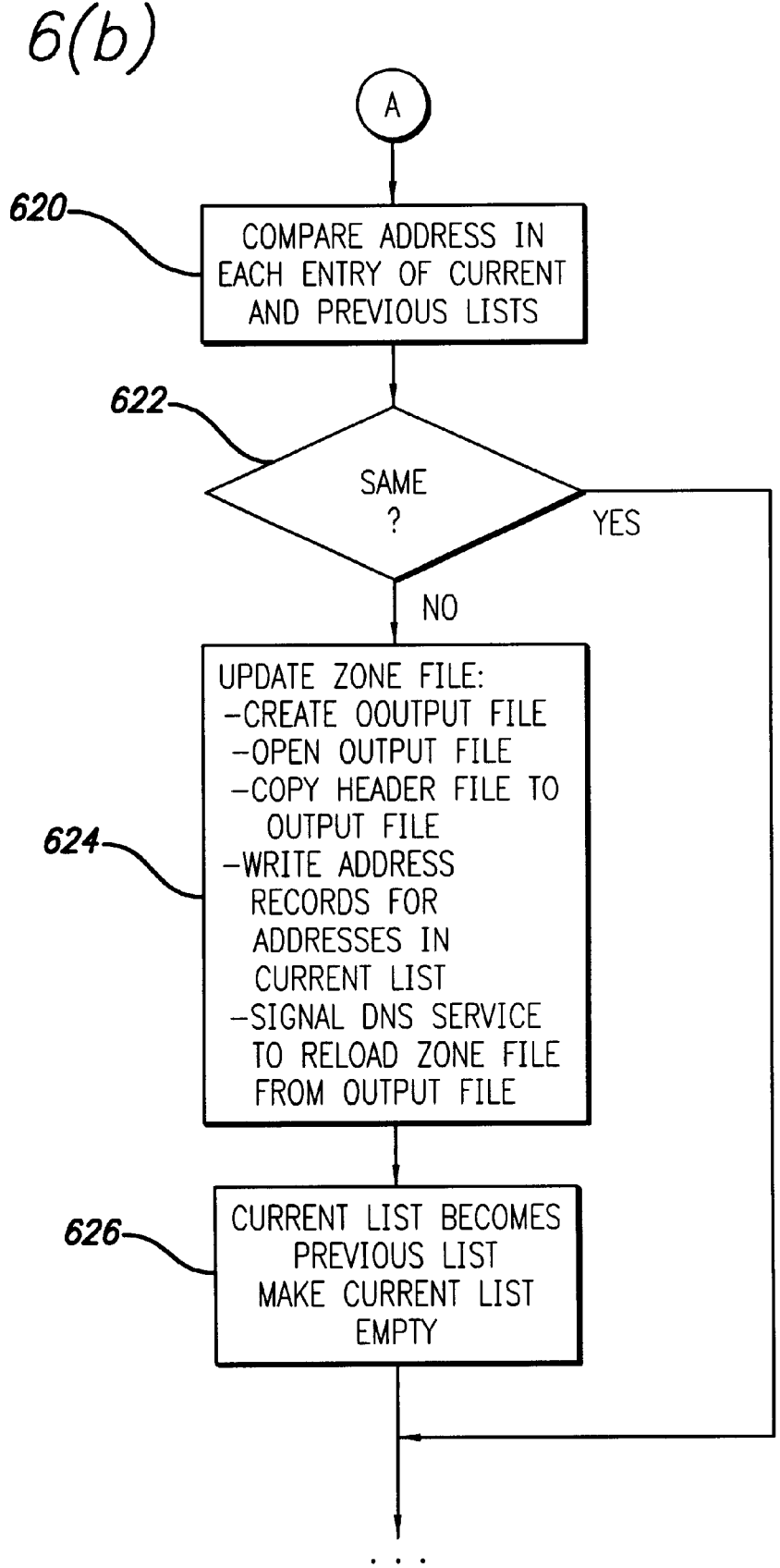

FIGS. 6(a) and 6(b) are flow charts of steps performed by Name Binding Modifier 176 of FIG. 1. Initially, Name Binding Modifier 176 initializes respective system timers for each service (not shown). When one of the timers times out in step 602, Name Binding Modifier 176 locates the current and previous lists for the service in step 604. In step 606, the current list is sorted by load. In step 608, Name Binding Modifier 176 counts the number of entries in the current list ($N_{bli}$) that contain workload values below a desired load index. The desired load index is determined in accordance with the configuration file of FIG. 8. In step 610, if $N_{bli}$ is greater than the minimum number of entries in the current list, then there are more than enough entries in the list that contain load values less than the load index and, in step 612, the current list is pruned of entries having a workload value above the workload index (i.e., so that $N_{bli}$ entries remain). If not, in step 614, the current list is pruned so that the minimum number of entries remain. After steps 612 and 614, control passes to FIG. 6(b).

In step 620 of FIG. 6(b), the host addresses of the current and previous lists for the service are compared. If the two lists are not the same, then it is necessary to modify the zone files in step 624. Step 624 creates a temporary output file. Header file 172 is copied to the output file. Next, the address records for the addresses in the current list are written to the output file. Lastly, Name Binder Modifier 176 signals DNS server 170 to reload a zone file for the service from the output file. DNS server 170 will now have up-to-date information on the state of the system. In step 626, the current list for the service ID becomes the previous list and the current list is made empty.

If, for example, there are four available news servers (one host address each) and the maximum load for each service is 60%, the minimum number of servers for each service is two, and the services are advertising the following loads:

10%: news1
    65%: news2
    70%: news3
    80%: news4

Only entries for news3 and news4 are removed from the current list. Even though the host of news2 has a workload value greater than 60%, removing news2 from the list would leave less than two entries in the list, so news2 is not removed. For a given service, proper operation requires that the update interval used by Service Monitor 180 be of much shorter duration (half or less) than the update interval used by Name Binder Modifier 176. Otherwise, it would be possible that not all available services would send a broadcast message during each update interval of Name Binder Modifier 176.

FIG. 7 shows an example of a configuration file 182 for Service Monitor 180. The configuration file includes three types of statements: "service" statements, "sample" load statements, and "exclude" statements. A "service" statement 702, which specifies the service available at a site, includes the term "service" followed by three arguments. A first argument (e.g., "60") is the update interval for the service (also called the "refresh interval") or the "heartbeat interval.") in a time unit such as seconds. The update interval is specified in time units, such as seconds. For example, in FIG. 7, the duration of the http timer is 60 seconds and the duration of the news timer is 120 seconds.

A second argument (e.g., "http") is the name of a service. A third argument (e.g., "80") is a communications endpoint used to verify the availability of the service on a host. In the described embodiment, this communication endpoint is a TCP port number.

When a service is initialized, Service Monitor 180 obtains an update interval for the service from the configuration file. A broadcast message is sent by the service at the expiration of each update interval if it is determined that the service is available on the host. At initialization, the service also obtains the communications endpoint for the service in accordance with the configuration file.

Thus, the example configuration file of FIG. 7 corresponds to the servers of FIG. 2. In the configuration file, the update interval for the service http is 60 time units (e.g., 60 seconds) and the update interval for the service news is 120 time units (e.g., 120 seconds). The http service uses port 80 and the news service uses port 119.

A "sample" load statement 704 specifies how frequently the load on a host should be measured. In this example, the sampling interval is 120 seconds. In the current implementation, only CPU utilization is measured. Various implementations may use any various known methods of measuring load. In one implementation, the configuration file contains the name of a routine to be used to measure load.

An "exclude" statement eliminates certain host addresses and subnets from being advertised. This exclusion reduces the number of broadcast messages if certain addresses should not participate in providing services.

Other implementations may provide support for UDP based services and more sophisticated per service liveliness test and load measurements. Service Monitor 180 can query the host operating system kernel to determine if there is any process listening on a specified UDP port. More sophisticated per service load measurement may be accomplished through loadable modules that are service specific. For example, an http modules may retrieve a document from the http server to test for liveliness, and use the response time as an indication of load on the http server. Value added http servers may also provide its measured average response time to the http module.

FIG. 8 shows an example of a configuration file for Name Binder Modifier 176. The operation of Name Binder Modifier 176 is controlled by dns-update statements. One "dns-update" statement 802 occurs for each service. The statement includes the term "dns-update" followed by six arguments. A first argument (e.g., "120") is the update interval (also called the "refresh interval") for a service. It determines how frequently bindings associated with a service/zone are updated. A second argument (e.g., "http") is the name of the service. Third and fourth arguments are the names of the header and output files for the service. A fifth argument is the minimum number of addresses that should be in the zone when possible. A sixth argument is the desired maximum load index for the service.

FIG. 9 shows an example of a configuration file for DNS service 170. For each zone, the configuration file specifies a method to be used for load-balancing within the zone. Thus, DNS service 170 may use different methods, such as round robin, etc. to load balance within different zones. The first field of the configuration file holds the domain name of the zone. The second field of the configuration file holds a file name of a file containing descriptions/information on the zone.

In summary, the load distributing DNS server provides finer grain load distribution during each name resolution, while the Name Binding Modifier provides coarse grain load balancing based on load information provided by the Service Monitor. In addition, broadcast messages by the Service Monitor advertises available servers. The Name Binding Modifier depends on these broadcast messages to add and remove host addresses to zones to reflect new servers, as well as failed servers.

Together the load distributing DNS server, the Service Monitor, and the Name Binding Modifier provide scalability and reliability for TCP based services on redundant servers. Multiple servers provide scalability, and reconfiguration around failed servers provide reliability.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. In a computer system adapted to offer a plurality of services to a plurality of client devices, the computer system including at least one name server and a plurality of hosts, each host adapted to offer at least one of the plurality of services, a method for automatically reconfiguring a workload among the plurality of hosts comprising the steps of:

for each host, periodically determining by a Service Monitor executing on the host which, if any, of the offered services are available from the host;

for each service determined to be available, sending by the Service Monitor executing on the host from which the service is available a broadcast message including a workload of the host and a list of host addresses for accessing the available service from the host;

receiving, by a Name Binding Modifier, each broadcast message;

for each service offered by the computer system, periodically compiling by the Name Binding Modifier a list of currently available host addresses received through the broadcast messages, and truncating said list of host addresses by the Name Binding Modifier in accordance with a set of predetermined criteria, wherein, in the step of truncating, entries having a workload value greater than a predetermined workload index are removed from the list of currently available host addresses;

for each service offered by the computer system, updating a corresponding zone file in accordance with the information from the list of currently available host addresses associated with the service; and in response to a service request from one of the client devices, performing, by the name server, a load balancing operation in accordance with the updated zone file corresponding to the requested service.

2. In a computer system adapted to offer a plurality of services to a plurality of client devices, the computer system including at least one name server and a plurality of hosts, each host adapted to offer at least one of the plurality of services, a method for automatically reconfiguring a workload among the plurality of hosts comprising the steps of:

for each host, periodically determining by a Service Monitor executing on the host which, if any, of the offered services are available from the host;

for each service determined to be available, sending by the Service Monitor executing on the host from which the service is available a broadcast message including a workload of the host and a list of host addresses for accessing the available service from the host;

receiving, by a Name Binding Modifier, each broadcast message;

for each service offered by the computer system, periodically compiling by the Name Binding Modifier a list of currently available host addresses received through the broadcast messages, and truncating said list of host addresses by the Name Binding Modifier in accordance with a set of predetermined criteria, wherein the step of truncating is only performed if the number of entries in the list of currently available host addresses is greater than a predetermined minimum number of entries;

for each service offered by the computer system, updating a corresponding zone file in accordance with the information from the list of currently available host addresses associated with the service; and in response to a service request from one of the client devices, performing, by the name server, a load balancing operation in accordance with the updated zone file corresponding to the requested service.

3. In a computer system adapted to offer a plurality of services to a plurality of client devices, the computer system including at least one name server and a plurality of hosts, each host adapted to offer at least one of the plurality of services, a method for automatically reconfiguring a workload among the plurality of hosts comprising the steps of:

for each host, periodically determining by a Service Monitor executing on the host which, if any, of the offered services are available from the host;

for each service determined to be available, sending by the Service Monitor executing on the host from which the service is available a broadcast message including a workload of the host and a list of host addresses for accessing the available service from the host;

receiving, by a Name Binding Modifier, each broadcast message;

for each service offered by the computer system, periodically compiling by the Name Binding Modifier a list of currently available host addresses received through the broadcast messages, and truncating said list of host addresses by the Name Binding Modifier in accordance with a set of predetermined criteria;

for each service offered by the computer system, updating a corresponding zone file in accordance with the information from the list of currently available host addresses associated with the service, wherein the step of updating comprises the steps of comparing the truncated list of currently available host addresses to a truncated list of previously available host addresses, and modifying the corresponding zone file for the service only if the truncated list of currently available host addresses differs from the truncated list of previously available host addresses; and in response to a service request from one of the client devices, performing, by the name server, a load balancing operation in accordance with the updated zone file corresponding to the requested service.

4. The method of claim 3 wherein the truncated list of previously available host addresses for the current period is the truncated list of currently available host addresses from the preceding period.

5. A computer system adapted to offer a plurality of services to a plurality of client devices, the computer system comprising:

a plurality of hosts, each host adapted to offer at least one of the plurality of services and including a Service Monitor configured to periodically send, for each available service on the host, a broadcast message including a workload of the host on which the available service is located and a list of host addresses for accessing the available service on the host;

a Name Binding Modifier adapted to receive each broadcast message and, for each of the plurality of services offered by the computer system, periodically compile a list of currently available host addresses received through the broadcast messages, remove certain entries from the list of currently available host addresses if a corresponding set of predetermined criteria is satisfied, and update a corresponding zone file in accordance with the compiled list, wherein the Name Binding Modifier is further adapted to compare the list of currently available host addresses to a previous list of host addresses, and the corresponding zone file is not updated unless the list of currently available host addresses differs from the previous list of host addresses; and a name server adapted to receive a plurality of service requests from a plurality of client devices, and for each service request received, perform a load balancing operation in accordance with the updated zone file corresponding to the requested service, thereby assigning the service request to a next available host offering the requested service.

6. The computer system of claim 5 wherein the previous list of host addresses for the current period is the list of currently available host addresses from the preceding period.

7. A computer program product for reconfiguring a load balancing system, the computer program product embodying computer program instructions for execution by a computer system offering a plurality of services, the instructions comprising:

determining, at predetermined time intervals, the availability of each service offered by the computer system;

sending, for each service determined to be available, a broadcast message including a workload of a host on which the service is available and a list of host addresses for accessing the available service from the host;

receiving each broadcast message;

compiling, at predetermined time intervals for each service offered by the computer system, a list of currently available host addresses received through the broadcast messages, adding each received host address and corresponding workload to the list of currently available host addresses, and removing entries from the list of currently available host addresses in accordance with a set of predetermined criteria; and updating, for each list of currently available host addresses, a zone file associated with the corresponding service offered by the computer system, whereby the zone file is available to the computer system for use in load balancing operations in response to a request for the corresponding service, wherein the instruction of updating further comprises the instructions of comparing the list of currently available host addresses to a previous list of host addresses, and updating the corresponding zone file for the service only if the list of currently available host addresses differs from the previous list of host addresses.

8. The computer program product of claim 7 wherein the previous list of host addresses for the current time interval is the list of currently available host addresses from the preceding time interval.

* * * * *